Patented July 8, 1947

2,423,783

UNITED STATES PATENT OFFICE 2,423,783

PROCESS FOR MAKING 1,3-DIOLS FROM OLEFINS AND ALDEHYDES

Samuel B. Lippincott, Westfield, N. J., assignor to Standard Oil Development Company, a corporation of Delaware No Drawing. Application December 29, 1945, Serial No. 638,437

5 Claims. (Cl. 260—635)

1

The present invention relates to the field of petroleum chemicals, more particularly to methods for 1,3-dioxane and 1,3-diol production and especially to a method for utilizing the by-product from processes producing 1,3-diols.

The condensation of olefins with aldehydes, particularly formaldehyde, in the presence of an acid catalyst such as sulfuric acid to form 1,3-dioxane, also designated as cyclic acetals or cyclic diethers, is well known. 1,3-dioxanes or meta-dioxanes are organic compounds possessing a 6-membered ring composed of 4 carbon atoms and 2 oxygen atoms with the oxygen atoms in the 1,3 position. Meta-dioxanes as well as di-oxolanes, which are cyclic ethers having a 5-membered ring of 3 carbon atoms and 2 oxygen atoms, are convertible to polyhydric alcohols by hydrolysis in the presence of a dilute acid such as sulfuric acid according to the method described by Mikeska in U. S. Patent 2,307,894, issued January 12, 1943. One of the difficulties heretofore encountered in carrying out such hydrolysis reactions is that, unless some provision is made for removing one of the reaction products, an equilibrium is set up which prevents the reaction from going to completion. Also, in such reactions, an aldehyde is formed during the conversion of the cyclicacetal, and normally, this aldehyde condenses with itself or with some of the other desirable substances present to yield aldehyde condensation products from which the aldehyde cannot be readily recovered.

The conversion of meta-dioxanes and dioxolanes to polyhydric alcohols can be improved, as to yield, by reacting the cyclic acetals with alcohols, such as methyl alcohol, under appropriate conditions (Mikeska and Arundale U. S. Patent 2,337,059). Converting cyclic acetals to polyhydric alcohols liberates an aldehyde, such as formaldehyde, which is taken up by the methyl alcohol forming acetals such as methylal, a low boiling compound that can be removed continuously from the reaction zone by fractionation. In general, the process is carried out by refluxing a mixture of the cyclic acetal and the alcohol at a temperature of 50-90° C. and atmospheric pressure. The reaction may be carried out in the presence or absence of a catalyst such as sulfuric acid of 85 or more per cent concentration, but the use of a catalyst results in an increased reaction rate. The principal objection to this process is that the formaldehyde is recovered in a form in which it is not readily available for re-use.

The principal object of the present invention

2 is a process for making the component parts of acetals available for use in chemical processes. This and other objects will be apparent to those skilled in the art upon reading the following description.

It has now been found that acetals can be reacted with organic acids in the absence or presence of an acid catalyst such as sulfuric acid to give the corresponding ester and aldehyde. If either one of the products is lower boiling than any of the reactants it may be removed by distillation thus shifting the equilibrium and the products may be obtained in practically quantitative yields. According to the present invention a mixture of methylal and formic acid, for example, is distilled at a temperature of 32–32.5° C. at the top of the fractionating column and atmospheric pressure. Distillation is discontinued when the temperature exceeds 32.5° C. The distillate is methyl formate and the residue from the distillation, when cool, a slurry of para-formaldehyde in the excess formic acid which can be used to provide the necessary formaldehyde in an olefin-formaldehyde condensation process yielding a meta-dioxane. The methyl formate condensate can then be hydrolyzed with water at room temperature or above, not to exceed about 50° C., and in the presence of dilute sulfuric acid (1–10%) if desired, to give methyl alcohol and formic acid. These may be separated by distillation and the methyl alcohol returned to the process wherein cyclic acetals are converted to diols while the formic acid may be reacted with methylal.

The following examples will serve to illustrate the specific embodiments of the present invention.

*Example 1*

56 parts by weight of methylal, 92 parts by weight of formic acid and 30 parts by weight of 10% sulfuric acid were placed in a reaction vessel equipped with an efficient fractionating column and heated. 120 parts by weight of methyl formate were taken overhead at 32–32.5° C. and condensed. The residue in the reaction vessel contained 30 parts by weight of para-formaldehyde. The methyl formate was then mixed with 36 parts by weight of water together with 2 parts by weight of concentrated sulfuric acid and warmed to 50° C. for 1 hour. This mixture was then distilled at 65° C. yielding 46 parts by weight of methyl alcohol as a distillate and 92 parts by weight of formic acid as a residue.

*Example 2*

A mixture of methylal (82.5 g., 1 mol methylal, 0.2 mol methanol) and formic acid (125 cc., 3.3 mols) was refluxed under a packed column and the distillate removed at a rate such that the temperature did not rise above 32.5° C. The methyl formate (133 g., 2.2 mols, 100% yield) was collected over a period of four hours. When all of the methyl formate had distilled the vapor temperature rose sharply and distillation was stopped when the temperature reached 75°. The fraction collected at 32.5° to 75° amounted to only 0.5 g. The residue consisted of a solution of formaldehyde in formic acid from which solid polymer of formaldehyde separated upon cooling.

*Example 3*

Acetal (118 g., 1 mol) and formic acid (138 g., 3 mols) were mixed in a flask and the mixture was distilled through a packed column at a reflux ratio great enough to maintain the vapor temperature at below 22°. When the temperature could no longer be kept down even at total reflux it was allowed to rise to 30°. The distillate, 20°–30°, mostly at 20–21° was acetaldehyde (44 g.–100% yield). Distillation was continued at a reflux ratio of 20:1. The intermediate fraction (3 ml.) was collected at 30–50°. The third fraction was ethyl formate (148 g.–100% yield) distilling at 50–55°, mostly at 52–53°. The residue was a dark liquid (58 g.). Since an excess of one mol of formic acid (46 g.) was used and one mol of water (18 g.) would be produced during the reaction the expected residue would be the sum of these (64 g.). A small amount of water was observed in the distillate.

*Example 4*

Acetal (118 g., 1 mol), glacial acetic acid (205 g., 3.4 mols) and toluene sulfonic acid, monohydrate (1 g.) were mixed and the mixture distilled through a packed column at such a rate that the vapor temperature did not exceed 25°. The distillate (41 g.) represents a yield of 93% as acetaldehyde. The second fraction (5 g.) distilled at 25–67°. The main fraction (177 g.) was collected at 67–85°, mostly at 70–71°. This would represent a 100% yield of ethyl acetate if it were pure but a little water was noticed in the distillate and 70–71° represents the boiling point of the azeotropic mixture of ethyl acetate and water so the actual yield as somewhat less than 100%. The residue (105 g.) was a dark liquid consisting mostly of the excess acetic acid (85 g.) and water of reaction (18 g. at most). The rest of the residue probably consists of condensation products from the acetaldehyde that was not obtained in the first fraction.

What is claimed is:

1. In a process for converting aliphatic olefins to polyhydric alcohols wherein aliphatic olefins are condensed with formaldehyde in the presence of an acid catalyst to form 1,3-dioxanes which are reacted with methyl alcohol in the presence of a strong acid catalyst to form 1,3-diol and methylal, the improvement which comprises reacting the methylal with formic acid in the presence of sulfuric acid to form methyl formate and a slurry of formaldehyde in sulfuric acid, distilling the methyl formate and returning the formaldehyde and sulfuric acid to the olefin condensation step; hydrolyzing the methyl formate to methyl alcohol and formic acid, separating the methyl alcohol and formic acid, returning the separated methyl alcohol to said reaction with the 1,3-dioxane, and returning the formic acid to said reaction with the methylal.

2. Process for converting aliphatic olefins to 1,3-diols, comprising condensing an aliphatic olefin with formaldehyde in the presence of an acid catalyst to form a 1,3-dioxane, reacting the 1,3-dioxane with methyl alcohol in the presence of an acid catalyst to form the desired 1,3-diol and methylal, separately removing the methylal, as it is formed, by distillation from the reaction mixture, reacting the separated methylal with a fatty acid in the presence of a strong acid catalyst to form an ester of said acid and formaldehyde, separating the resulting ester and formaldehyde, returning the separated formaldehyde to said olefin condensation reaction, hydrolyzing the separated ester to the corresponding fatty acid and methyl alcohol, separating the resulting fatty acid and alcohol, returning the separated methyl alcohol to said reaction with the 1,3-dioxane and returning the separated fatty acid to said reaction with the methylal.

3. Process for converting aliphatic olefins to 1,3-diols, comprising condensing an aliphatic olefin with formaldehyde in the presence of a sulfuric acid catalyst to form a 1,3-dioxane, reacting the 1,3-dioxane with methyl alcohol in the presence of said catalyst to form the desired 1,3-diol and methylal, separating the methylal, as it is formed, by distillation from the reaction mixture, reacting the separated methylal with a volatile fatty acid in the presence of sulfuric acid to form a methyl ester of said fatty acid and formaldehyde, distilling the methyl ester from the reaction mixture and returning the distillation residue, comprising formaldehyde and sulfuric acid, to the olefin condensation reaction step, hydrolyzing the distilled methyl ester to methyl alcohol and said fatty acid, separating the hydrolyzed products, returning the separated methyl alcohol to said reaction with the 1,3-dioxane and returning the separated fatty acid to said reaction with the methylal.

4. Process according to claim 2, in which said fatty acid is formic acid.

5. Process according to claim 2, in which said fatty acid is acetic acid.

SAMUEL B. LIPPINCOTT.

REFERENCES CITED

The following references are of record in the file of this patent:

UNITED STATES PATENTS

| Number | Name | Date |
|---|---|---|
| 2,307,894 | Mikeska I | Jan. 12, 1943 |
| 2,337,059 | Mikeska et al. II | Dec. 21, 1943 |
| 2,160,064 | Eversoll | May 30, 1939 |
| 2,246,049 | Lange | June 17, 1941 |
| 2,366,738 | Loder et al. | Jan. 9, 1945 |

OTHER REFERENCES

Orton et al., Jour. Chem. Soc. (London), vol. 109 (1916), pt. 1, p. 185.

Beilstein, Annalen der Chem., vol. 112 (1859), pp. 239–240.